Patented June 26, 1945

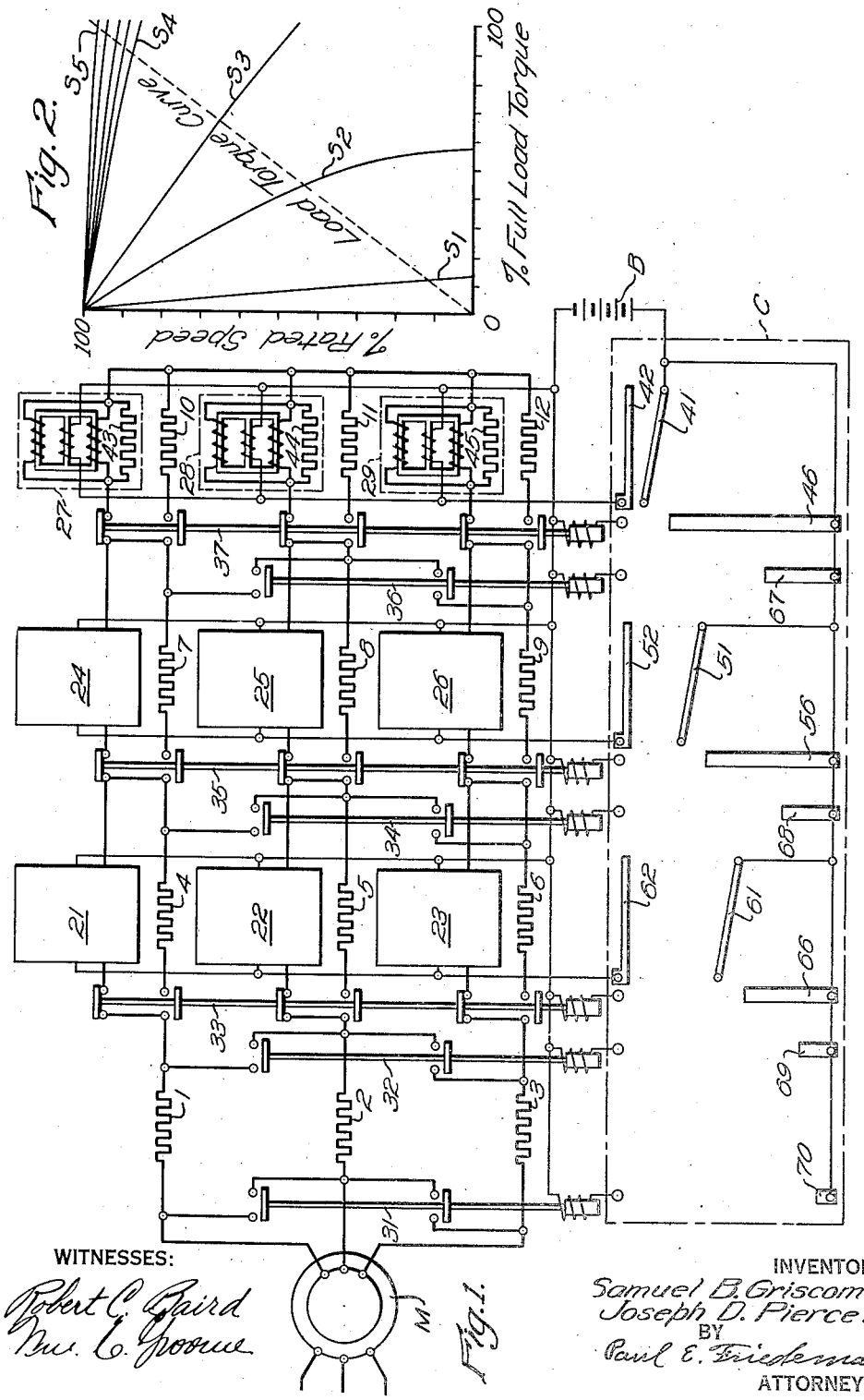

2,379,146

UNITED STATES PATENT OFFICE 2,379,146

CONTROL FOR WOUND ROTOR INDUCTION MOTORS

Samuel B. Griscom, Wilkinsburg, Pa., and Joseph D. Pierce, Washington, D. C., assignors to Westinghouse Electric Corporation, East Pittsburgh, Pa., a corporation of Pennsylvania Application March 16, 1943, Serial No. 479,358

6 Claims. (Cl. 172—289)

Our invention relates to control systems for alternating-current motors, and more particularly to starting control systems for wound rotor induction motors.

Starting control systems of the rheostatic type for wound rotor induction motors are well known in the art and usually provide for the successive shunting of the resistor sections normally provided for the secondary of the motor.

These known resistance type starters usually provide for very coarse steps of speed change. When it is desired to make the speed changes more smooth, expensive, complicated, and bulky drum controllers are needed, or, when electromagnetic control is used, a complicated and expensive arrangement of magnetic contactors and their circuits is needed, and often with electromagnetic control a drum controller is also needed.

It is one object of our invention to provide for smooth starting and numerous running points of wound rotor induction motors by the use of adjustable saturable reactor means in the secondary of a wound rotor motor.

A more specific object of our invention is the provision of smooth starting of wound rotor induction motors by the use of a combination of resistance and reactance control of the secondary circuit of a wound rotor induction motor.

The specific objects mentioned are merely illustrative of many other objects and advantages that will become more apparent from a study of the following specification when taken in conjunction with the accompanying drawing, in which:

Figure 1 is a digrammatic showing of our invention as applied to a wound rotor induction motor; and Fig. 2 illustrates speed torque curves of a typical large size wound rotor induction motor.

In Fig. 1 the wound rotor induction motor M is shown provided with a plurality of resistors, as 1, 2, 3, 4, 5, 6, 7, 8, 9, 10, 11, 12, etc., and a plurality of reactors, as 21, 22, 23, 24, 25, 26, 27, 28, 29, etc., connected in the circuit of the secondary winding of the motor.

We provide a suitable controller C for effecting the energization, and thus sequential operation of a plurality of magnetic contactors 31, 32, 33, 34, 35, 36, and 37, from a suitable source of control potential as battery B. Battery B, through suitable operation of the drum controller also controls the reactance value of the reactors.

The reactors are all substantially alike and are of the saturable type. This type of reactor usually has three legs where one leg is energized with direct current. By varying the direct current excitation the reactance value of such a reactor may be varied.

A better understanding of our invention may be had from a study of a typical starting cycle. Assuming that the main switch (not shown) connecting the primary winding of motor M is closed so that the motor is ready to be accelerated. Before the controller C is actuated the motor M will accelerate, likely following the curved dotted line, to a speed such as indicated by point $S_1$. If only the knowledge of the prior art were used and the resistor sections 10, 11, 12, and 7, 8, 9, and 4, 5, 6, and 1, 2, 3, were shunted in the order named, the speed of the motor would be changed in very coarse steps, the speed jumping almost directly from $S_1$ to $S_2$, from $S_2$ to $S_3$, etc. We however, provide an inexpensive and smooth control.

To effect our novel starting, the attendant slowly moves the controller upwardly. The resistor segment 41 makes contact with the stationary conductor strip 42, and as the controller is moved upwardly less and less of segment 41 remains in contact with strip 42. This means that the unsaturated middle legs are first energized with a small direct current from source B and then the current value in the middle leg is gradually increased until the reactors 27, 28 and 29 all become saturated.

In the unsaturated state, the effective ohmic value of the reactors is high relative to the ohmic value of the associated resistor section, as sections 43, 44 and 45. As a consequence, most of the currents flow through these resistors. As the reactors become saturated their ohmic value decreases and in consequence more and more current is shunted past the resistors 43, 44 and 45.

This process of diverting the current from the associated resistors, as 43, 44 and 45, taken alone would tend to reduce the $I^2R$ losses in these associated resistors and thus tend to reduce the motor torque (which is proportional to rotor, or secondary, circuit loss). However, the reduction in the effective ohmic value of the reactors (for any existing motor speed) reduces the total rotor circuit impedance and therefore increases the total secondary current. The $I^2R$ losses in the resistors 43, 44 and 45 is thus decreased. By a proper control of the ohmic values of resistor sections 1 to 9, inclusive, and the sections 43, 44 and 45, the net result can always be an increase in the total rotor circuit loss as the reactance of the reactors is diminished. An increase in torque is thus obtained and the final result is an increase in speed. This process is progressive; that is, further increases in speed and torque will result until the reactance is reduced to a minimum, at which time, the speed-torque characteristic is largely controlled by the resistors 1 to 9, inclusive. This, of course, happens when all of resistor segments 41 is shunted.

At the end of this stage just discussed, segment 46 closes an energizing circuit for contactor 37. This contactor closes the circuit for resistor sections 10, 11 and 12 and removes the reactors 27, 28 and 29 from the secondary control. In effecting this mentioned transfer the transition will be made smooth. This can readily be done by making the resistance value of resistors 10, 11 and 12 correspond as near as practicable to the respective resistance values of resistor sections 27—43, 28—44, and 29—45. Resistor sections 43, 44 and 45 are practically shorted by the reactors so that for practical purposes resistors 10, 11 and 12 are equal to effective resistance of reactors 27, 28 and 29. If a speed change is desired at the transition then the resistance values of these resistor sections 10, 11 and 12 need not be made to correspond to those of resistor sections 43, 44 and 45.

A moment after the transition effected by the operation of contactor 37, resistance segment 51 begins to contact conductor strip 52, and the adjustment of the reactance value of reactors 24, 25 and 26 begins and is carried through until segment 56 effects the operation of contactor 35. Operation of contactor 35 inserts resistor segments 7, 8 and 9 in the secondary circuit and removes reactors 24, 25 and 26.

At the end of the transition effected by contactor 35, resistance segment 61 cooperates with conductor segment and the reactance adjustment of reactors 21, 22 and 23 is carried through. At the end of this operation, segment 66 effects the operation of contactor 33 which causes the insertion of resistor sections 4, 5 and 6 in the secondary circuit and also effects the removal of the reactors 21, 22 and 23 from the secondary circuit.

The foregoing operations thus effect a smooth transition from speed $S_1$ successively to speeds $S_2$, $S_3$ to $S_4$.

Continued movement of controller C through segments 67, 68, 69 and 70 effects the successive operation of contactors 36, 34, 32 and 31 to thus bring the motor up to the final full speed $S_5$.

The control shown is actually one that might be used on a relatively large wound rotor induction motor, say 100 H. P. or more. For small wound rotor induction motors only one set of reactors, as 21, 22 and 23 and their associated resistors 4, 5 and 6, and resistor sections 1, 2 and 3 may suffice without falling short of the essential features of our invention.

We are, of course, aware that others skilled in the art may, particularly having had the benefit of our disclosure, devise other arrangements of reactors and resistors for accomplishing the novel results of our invention. We, therefore, do not wish to be limited to the particular showing made, but wish to be limited only by the scope of the appended claims.

We claim as our invention:

1. In a control for an electric motor, in combination, a wound rotor induction motor having a primary winding for connection to a source of alternating current and having a secondary winding, a reactor having a magnetic circuit including three parallel legs, a pair of parallelly connected coils, one on one leg and the other on the other leg, connected in the circuit of the secondary winding, a resistor connected in parallel with said coils, a resistor connected in series with the two parallelly connected coils and thus also connection in the circuit of the secondary winding, a control coil disposed on the third leg of the reactor, and adjustable control means operable to control the energization of the control coil with direct current that varies with the operation of said control means, from zero value to a value sufficiently high to saturate said third leg of the reactor, and means, operable after said third leg of said reactor has become saturated, for shunting the resistor connected in series with the two parallelly connected coils.

2. In a control for an electric motor, in combination, a wound rotor induction motor having a primary winding for connection to a source of alternating current and having a secondary winding, a reactor having a magnetic circuit including three parallel legs, a pair of parallelly connected coils, one on one leg and the other on the other leg, connected in the circuit of the secondary winding, a resistor connected in parallel with said coils, a control coil disposed on the third leg of the reactor, adjustable control means operable to control the energization of the control coil with direct current that varies with the operation of said control means, from zero value to a value sufficiently high to saturate said third leg of the reactor, and means for removing said reactor and the resistor connected in parallel to the two parallelly connected coils from the circuit of the secondary winding.

3. In a control for an electric motor, in combination, a wound rotor induction motor having a primary winding for connection to a source of alternating current and having a secondary winding, a reactor having a magnetic circuit including three parallel legs, a pair of parallelly connected coils, one on one leg and the other on the other leg, connected in the circuit of the secondary winding, a resistor connected in parallel with said coils, a resistor connected in series with the two parallelly connected coils and thus also connection in the circuit of the secondary winding, a control coil disposed on the third leg of the reactor, and adjustable control means operable to control the energization of the control coil with direct current that varies with the operation of said control means, from zero value to a value sufficiently high to saturate said third leg of the reactor, and means, operable after said third leg of said reactor has become saturated, for shunting the resistor connected in series with the two parallelly connected coils, and means for removing said reactor and the resistor connected in parallel to the two parallelly connected coils from the circuit of the secondary winding.

4. A control for an electric motor, in combination, a wound rotor induction motor of the three-phase type having a primary winding and a secondary winding, a source of three-phase alternating current connected to energize the primary winding of said motor, $n$ number of resistor sections disposed to be connected in each of the phases of the secondary windings $(n-1)$, number of variable reactors disposed to be connected in each of the phases of the secondary windings, a controller, switching means for connecting one resistor section and all the reactors in the secondary winding, said controller including means, upon operation of the controller, for successively varying the reactance of each reactor from a maximum to a minimum, means operable by the controller to connect a resistor section in each phase of the secondary and disconnect the particular reactors from each section whose reactance has been decreased to a minimum until all the reactors are disconnected from the secondary windings and all the resistor sections are connected to the secondary windings.

5. A control for an electric motor, in combination, a wound rotor induction motor of the three-phase type having a primary winding and a secondary winding, a source of three-phase alternating current connected to energize the primary winding of said motor, $n$ number of resistor sections disposed to be connected in each of the phases of the secondary windings, $(n-1)$ number of variable reactors disposed to be connected in each of the phases of the secondary windings, a controller, switching means for connecting one resistor section and all the reactors in the secondary winding, said controller including means, upon operation of the controller, for successively varying the reactance of each reactor from a maximum to a minimum, means operable by the controller to connect a resistor section in each phase of the secondary and disconnect the particular reactors from each section whose reactance has been decreased to a minimum until all the reactors are disconnected from the secondary windings and all the resistor sections are connected to the secondary windings, the minimum impedance value of the reactors when the reactance has been decreased to a minimum being selected to be substantially equal to the resistance value of the resistor section that is substituted by the connection of a resistor section and a disconnection of a reactor.

6. A control for an electric motor, in combination, a wound rotor induction motor of the three-phase type having a primary winding and a secondary winding, a source of three-phase alternating current connected to energize the primary winding of said motor, $n$ number of resistor sections disposed to be connected in each of the phases of the secondary windings, $(n-1)$ number of variable reactors disposed to be connected in each of the phases of the secondary windings, a controller, switching means for connecting one resistor section and all the reactors in the secondary winding, said controller including means, upon operation of the controller, for successively varying the reactance of each reactor from a maximum to a minimum, means operable by the controller to connect a resistor section in each phase of the secondary and disconnect the particular reactors from each section whose reactance has been decreased to a minimum until all the reactors are disconnected from the secondary windings and all the resistor sections are connected to the secondary windings, and means operable by the controller for successively shunting all the resistor sections that are in circuit with the secondary winding when the last reactor has been eliminated from the secondary winding.

SAMUEL B. GRISCOM.
JOSEPH D. PIERCE.